US00RE35481E

United States Patent [19]

Wioskowski et al.

[11] E Patent Number: Re. 35,481

[45] Reissued Date of Patent: Mar. 25, 1997

[54] MULTIPLE STATION FLEXIBLE BORING MACHINE

[75] Inventors: Richard Wioskowski, Fraser; Howard H. Schafer, Ann Arbor; George P. Bader, Clinton Township; Edward J. Irvine, St. Clair Shores, all of Mich.

[73] Assignee: Western Atlas, Inc., Hebron, Ky.

[21] Appl. No.: 408,646

[22] Filed: Mar. 22, 1995

Related U.S. Patent Documents

Reissue of:

[64] Patent No.: 5,199,158
Issued: Apr. 6, 1993
Appl. No.: 920,764
Filed: Jul. 28, 1992

[51] Int. Cl.[6] ..... B23Q 7/02

[52] U.S. Cl. ..... 29/563; 29/33 P; 198/345.3; 408/70

[58] Field of Search ..... 29/33 P, 563, 29/564; 198/345.3, 346.1, 465.1, 378, 617, 803.01; 414/222; 408/49, 70, 71

[56] References Cited

U.S. PATENT DOCUMENTS

| | | | |
|---|---|---|---|
| 3,540,566 | 11/1970 | Perry et al. | 198/378 |
| 4,201,284 | 5/1980 | Brems | 198/345.3 |
| 4,246,683 | 1/1981 | Siarto | 29/563 X |
| 4,655,652 | 4/1987 | Schissler | 29/33 X |

FOREIGN PATENT DOCUMENTS

| | | | |
|---|---|---|---|
| 2804584 | 8/1979 | Germany | 29/33 P |
| 5166 | 1/1977 | Japan | 198/345.3 |
| 31511 | 3/1980 | Japan | 29/564 |
| 1374669 | 11/1974 | United Kingdom | 29/33 P |

*Primary Examiner*—William R. Briggs
*Attorney, Agent, or Firm*—Barnes, Kisselle, Raisch, Choate, Whittemore & Hulbert

[57] ABSTRACT

A method and multiple station flexible boring machine for transferring and locating a pallet carrying a workpiece to be machined. The machine has at least two machining stations and a part loading and unloading station adjacent a transfer table carried by a base for carrying, generally locating and transferring a pallet and a workpiece to each station. The pallet has a curvic coupling locator ring with a plurality of circumferentially spaced and generally radially extending teeth for complementary mating engagement with a locator ring on an independent base of each station to accurately radially, axially and circumferentially locate the pallet on the station base. At the load station, the locator ring on the pallet is received in complementary mating engagement with the locator ring on the load base accurately locating the pallet with respect to the base and a workpiece is loaded, accurately located with respect to the load base and clamped to the pallet. The transfer table generally locates and transfers the pallet from the load station onto the base of a first machining station accurately locating the workpiece for machining. After at least one machining operation is performed at that station, the table transfers the pallet and workpiece onto the base of the next machining station. Upon completing all machining operations, the pallet and workpiece are returned to the part load station where the finished workpiece is released and removed and thereafter another workpiece to be machined is loaded, accurately located and clamped to the pallet.

50 Claims, 4 Drawing Sheets

24
106
98
94
92
90
88
82
86
74
84
76
56
80
62
54
60
52
58
104
96
100
98
154
152
66
64
68
78
72
70
102

112
118
116
106
110
24

120
108
114
122
124
54
58
52'
62
160
56
104'
52
96'
100
154
152
64
78
68'
70'
102
120
154

MULTIPLE STATION FLEXIBLE BORING MACHINE

Matter enclosed in heavy brackets [ ] appears in the original patent but forms no part of this reissue specification; matter printed in italics indicates the additions made by reissue.

FIELD OF THE INVENTION

This invention relates to a multiple station flexible boring machine for transferring and locating a pallet carrying a workpiece to be machined and more particularly to a method and apparatus for transferring the workpiece on the pallet and accurately locating the workpiece and pallet at a machine tool where a machining operation is to be performed.

BACKGROUND

In the machining of parts to be used in manufacture, the critical tolerance of machined surfaces must be consistently maintained to produce products which are high in quality and reliability. To machine parts with the necessary precision, a part must be accurately located with respect to a machine tool performing the machining operation. Where high volume production of parts is required, an automated machining center, such as a multiple station boring machine, is frequently used to quickly and efficiently perform several machining operations on a part.

In the past, machines having at least two machine tool stations and a workpiece indexing table and having a single, common base have been used to perform several machining operations on a part or workpiece carried by a fixture. To provide consistent machining accuracy, each component of the machine must accurately radially, axially and circumferentially located with respect to every other component For example, each station attached to the base of the machine must be accurately radially, axially and circumferentially located with respect to each other and the transfer table. Additionally, each workpiece holding fixture must be accurately radially, axially and circumferentially located in its associated station.

In the typical operation of a machine of this kind, a fixture, already accurately located with respect to the indexing table carrying it, first receives a workpiece which is accurately located in the fixture. After clamping the workpiece in the fixture, the table is accurately indexed to deliver the workpiece to a first machine tool station. After all machining operations are performed at that station, the table accurately indexes the workpiece seriatim to each succeeding station in which machining operations are performed. Once all machining operations are completed on the workpiece, the table is indexed back to a station where the finished workpiece is removed from the fixture and another workpiece is transferred into the fixture to be machined.

A drawback of this prior art machine is that it is sensitive to any mislocation of any component involved in the machining process. For example, if the workpiece, fixture, indexing table or any machine tool is even slightly out of location, the workpiece may be machined out of acceptable tolerances resulting in the costly scrapping of the piece. This design is also subject to cumulative error because it requires that the workpiece be accurately located in the fixture, the fixture be accurately located on the table, and the table be accurately located and indexed with respect to each machine tool station, etc. Any single error in locating any component with respect to any other component may result in a potentially defect-producing machining error. More over, if two or more errors in location exist, the errors may aggregate to increase the amount that the workpiece may be out of tolerance raising the probability that the part will have to be scrapped.

The cumulative error problems commonly associated with this design also limit the machining accuracy, quality and reliability of the machine to produce a properly machined workpiece. This design also lacks flexibility and may be of limited cost-effectiveness by sharing a common base because index table or machine tool station obsolescence or failure may require the costly replacement of the entire machine.

The problems commonly encountered with this design require that each component of the machine be extremely accurately made and located as any location error will result in the costly scrapping of a defectively machined workpiece. Even worse, the incorporation of out-of-tolerance machined parts into a finished product will result in a product of inferior quality and reliability requiring warranty work to be performed, increasing customer returns and lessening profits Such an inflexible design also increases operation and replacement costs when any machine station or index table is rendered obsolete or unusable necessitating replacement of the entire machine.

SUMMARY OF THE INVENTION

A method, machine and pallet for locating and transferring a pallet carrying a workpiece thereon to be machined. The machine has a transfer table for generally receiving, locating and transporting a pallet on the table, at least one pallet for receiving and clamping a workpiece, and a part loading and unloading station and at least two machine tool stations adjacent the table. Each station has a separate base for receiving and accurately locating a workpiece-carrying pallet thereon.

The table has a base and a drive for transferring all pallets carried by the table. Each pallet has a locator ring, such as a curvic coupling, with a plurality of circumferentially spaced and generally radially extending teeth for accurately radially, axially and circumferentially locating the pallet. The part loading station has a locator ring on its base for complementary mating engagement with the ring of each pallet to accurately radially, axially and circumferentially locate the pallet with respect to the load base. After the workpiece is accurately located on the pallet with respect to its locator ring, the workpiece is releasably clamped to the pallet to accurately locate it on the pallet Each machine tool station has a locator ring on its base for complementary mating engagement with the ring of the pallet to accurately radially, axially and circumferentially locate the pallet and hence its workpiece for machining A clamping mechanism releasably secures the pallet to the base of the machining station while the two locator rings are engaged for maintaining the accurate location of the workpiece during machining.

In operation, a workpiece is placed upon a pallet at the load and unload station to accurately radially and axially locate the piece with respect to the pallet. Before clamping the workpiece to the pallet, a locator in the load station engages with a locator on the workpiece to determine that the workpiece is accurately circumferentially located on the pallet. Before the locator is retracted, the workpiece is releasably clamped to the pallet to accurately locate it radially, axially and circumferentially with respect to the pallet locator ring.

Upon the table transferring the pallet to the first machining station, its locator ring is matingly engaged with the ring of the tool base to accurately radially, axially and circumferentially locate the workpiece thereon. Before machining, a clamp of the tool base secures the pallet to the base while the locator rings are engaged to fix and maintain the accurate location of the workpiece during machining. After performing at least one machining operation on the workpiece in the first station, the pallet is released and transferred by the table seriatim to each succeeding machine tool station. Prior to machining the workpiece at each succeeding station, the pallet is clamped with its ring engaged with the ring of the station base to positively and accurately locate the workpiece. After all machining operations have been performed, the pallet and workpiece are transferred to the load station where the finished workpiece is released and removed from the pallet and thereafter another workpiece is loaded on the pallet.

Should a different machine tool be required or a replacement of the transfer table be necessary, one or more individual components of the machine may be flexibly changed without affecting the other components and machining accuracy. All that is required is for the base of a changed machine tool to be generally located with respect to the transfer table. If a different transfer mechanism is used, such as a swing arm transfer or another table, accurate location of a workpiece is guaranteed by only generally locating the transfer with respect to each machine tool station base.

This inherent flexibility lowers operating and equipment costs by enabling quick and easy machine tool and transfer mechanism changeover without sacrificing required accuracy. Cumulative error is also prevented because accurate location of each individual component with respect to each other component of the machine is unnecessary as the locator rings incorporated into this invention are generally insensitive to slight mislocation prior to engagement. Finally, a machine of this invention provides more precise location and increased machining accuracy of a workpiece increasing the quality and reliability of a finished part.

Objects, features and advantages of this invention are to provide a multiple station workpiece machining method and apparatus which greatly increases the accuracy of location of the workpiece with respect to the base of each machine tool, increases machining accuracy and reduces out of tolerance machining errors while greatly improving quality and reliability of the machined workpiece, enables quick and easy changing of single machine tool stations without sacrificing machining accuracy or obsoleting or needing to modify the entire multiple station machine, eliminates cumulative error in locating a workpiece in each machining station, and is reliable, flexible, durable and of simple design and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION OF THE INVENTION

Figure 1:
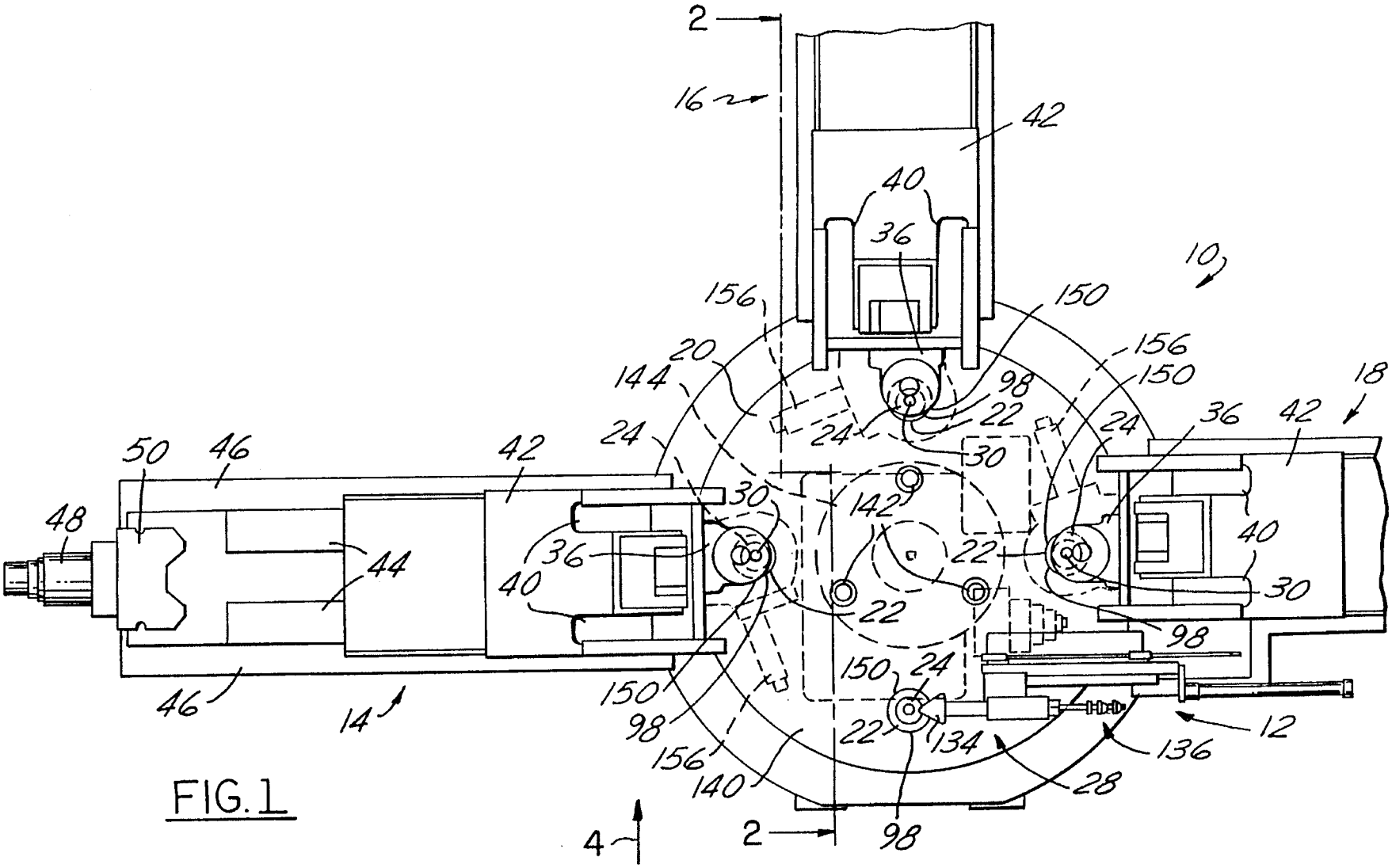
FIG. 1 is a partial top plan view of a dial machine with multiple flexible boring machine tools embodying this invention.

Referring in more detail to the drawings, FIG. 1 illustrates a dial machine 10 embodying this invention and having a part loading and unloading station 12, and first 14, second 16 and third 18 machine tools spaced generally circumferentially about the periphery of a transfer table 20 which can carry four pallets 22 each with a workpiece 24, such as a planetary gear carrier for a vehicle transmission. Each machine tool has a fixture 26 for receiving, accurately locating and releasably clamping a loaded pallet 22. The load and unload station 12 has a locator probe 28 adjacent the pallet 22 for accurately circumferentially orienting and locating the workpiece 24 on the pallet 22.

In the load station 12 while each pallet 22 is accurately located, a workpiece 24 is loaded onto the pallet 22 and accurately located and clamped thereon. Thereafter, the loaded pallet 22 is transferred by the table 20 sequentially into the work station of each machine tool where the pallet 22 is accurately located and clamped in the fixture 26 while machining operations are performed on the workpiece. After machining is completed by the third machine tool 18, the table transfers the loaded pallet into station 12 where the machined workpiece 24 is unclamped and unloaded from the machine 10.

Each machine tool is shown as a chucking or boring machine although other machine tools can be utilized as needed. Each machine tool has a spindle 30 driven by a motor 32 and journalled for rotation in a housing 34 mounted on a slide 36 carried by ways 38 for generally vertical reciprocation to advance and retract the spindle 30 which is shown in its fully advance position. The ways 38 are fixed to a support column 40 carried by a table 42 received on guideways 44 secured to a base 46 for reciprocating the spindle 30 to advance it generally radially wit respect to the workpiece 24 and transfer table 20. The column 40 is advanced and retracted by a servomotor 48 mounted on a bracket 50 secured to the base 46. Each machine tool may be of conventional construction and hence will not be described in further detail.

Figure 5:
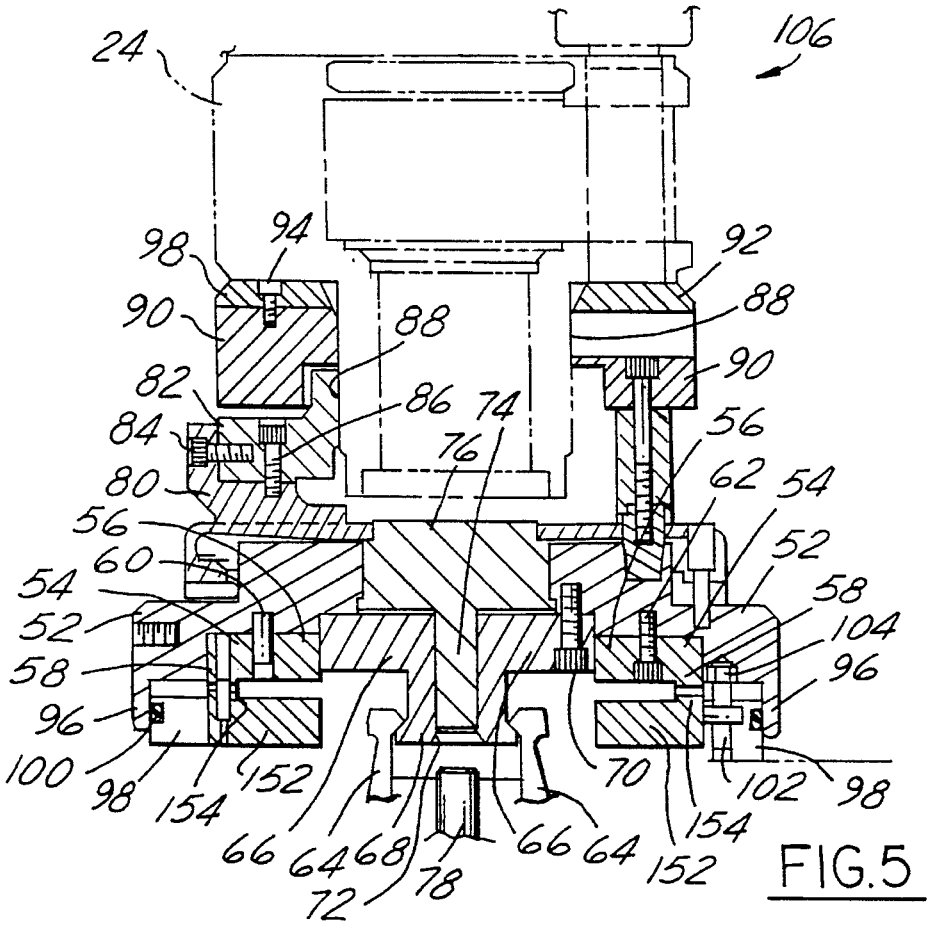
FIG. 5 is a sectional view of a pallet with an outside diameter clamp.

FIG. 5 illustrates the pallet 22 in more detail. To be located and received by each fixture 26, the pallet has a base 52 with a locator ring 54 attached thereunder. Each ring 54 is a generally circular ring-shaped plate 56 with a plurality of circumferentially spaced and generally radially extending teeth 58 in one face of the plate 56 for accurately locating the pallet 22 on the fixture 26. The ring 54 is accurately located with respect to the pallet 22 by at least one dowel 60 and is affixed to the base by cap screws 62.

For receiving a clamp 64 of each fixture 26, a plate 66 with a generally cylindrical collar having a frustoconical end 68 is attached to the underside of the base 52 by cap screws 70. Telescopically nested within a bore 72 through the collar 68 is an elongate shaft 74 extending from a second generally circular plate 76.

To load each pallet 22 while it is clamped to the fixture 26 in the load and unload station 12, a workpiece clamp release pin 78 is extended upwardly from the fixture 26 to displace the shaft 74 and plate 76 flexing upwardly a spring member 80 affixed to a plurality of clamp jaws 82 by cap screws 84, 86, rotating the jaws 82 outwardly. Upon opening the workpiece clamp jaw 82 of the pallet 22, a workpiece 24 can be loaded into and radially located on the pallet 22 by inserting a cylindrical portion 88 of the workpiece 24 downwardly into a chuck plate 90 on the pallet 22. A stop surface 92 secured to the plate 90 by cap screws 94 provides axial location of the workpiece 24 with respect to the locator ring 54 on the pallet 22. When received by the chuck plate 90, the workpiece 24 is accurately radially and axially located on the pallet 22 with respect to its locator ring 54. After the workpiece 24 is circumferentially located on the pallet 22, the pin 78 is retracted springing the clamp jaws 82 inwardly against the cylindrical outer diameter 88 of the workpiece 2 thereby releasably clamping the workpiece 24 in the pallet 22.

During transfer by the table 20, a skin 96 in the outer periphery of the pallet base 52 encircles a flange 98 on the table 20 and releasably frictionally engages with an O-ring 100 in the outer periphery of the flange 98 to radially retain the pallet 22 on the transfer table 20. To circumferentially maintain the general location of the pallet 22 while in transfer, a pair of circumferentially spaced apart locator pins 102 extending from the flange 98 are slidably received in a pair of complementary locator openings 104 in the underside of the pallet base 52 adjacent the skirt 96, one of which is shown. Additionally, in FIG. 5 a machine tool 106 is shown in machining engagement with the workpiece 24.

Figure 6:
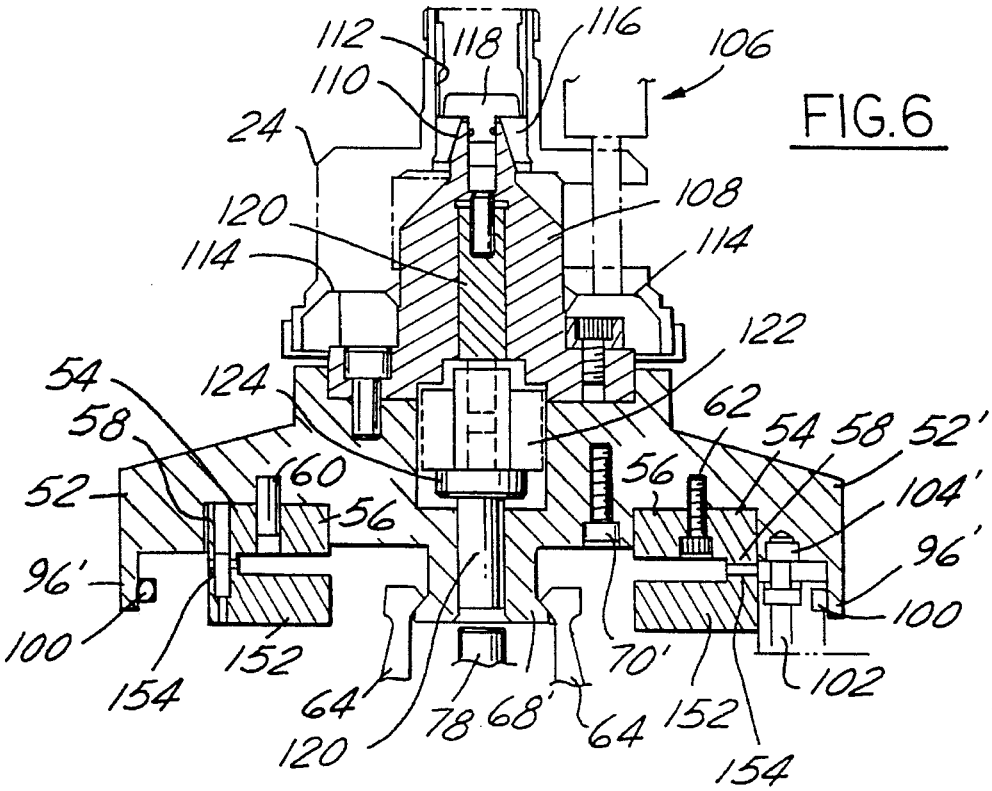
FIG. 6 is a sectional view of a modified pallet with an inside diameter clamp.

FIG. 6 illustrates a modified pallet 22' with a generally cylindrical mandrel 108 with a frustoconical end 110 attached to a pallet base 52' for receiving, and radially locating a workpiece 24' along an inner diametral surface 112 of the workpiece 24'. A stop surface 114 of the lower mandrel 108 is provided for axially locating the workpiece 24' with respect to the locator ring 54 on the pallet 22'. The workpiece 24' is shown releasably clamped by a diametrically expandable collet 116 on the mandrel 108. A cap 118 connected to a shaft 120 is downwardly biased by a spring 122 communicating against a washer 124 attached to the shaft 120 within the pallet base 52' to draw the collet 116 downwardly and cam it outwardly over the frustoconical mandrel surface 110. This expands the collet diameter into firm frictional engagement with the inner diametral surface 112 of the workpiece 24' to secure it in the pallet 22'. To release a workpiece 24', the workpiece clamp release pin 78 is extended to urge the shaft 120 and cap 118 upwardly to decrease the diameter of the collet 116 to less than the diameter of the inner surface 112 of the workpiece 24'.

Figure 3:
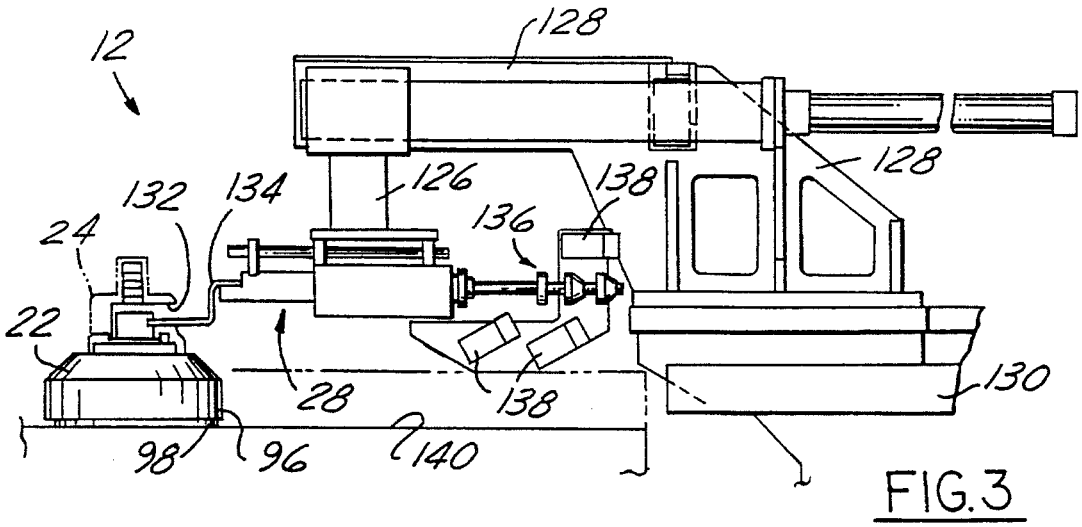
FIG. 3 is a partial side view of the dial machine shown in detail the part loading and unloading station.

As shown in FIGS. 1 and 3 in the part loading and unloading station 12, the elongate locator probe 28 is carried by a bracket 126 attached to a support 128 affixed to a base 130 of the station for circumferentially orienting and locating a workpiece 24 loaded on the pallet 22. Each workpiece 24 is loaded onto a pallet 22 already located and clamped on the load station fixture 26 with a locator opening 132 of the workpiece 24 generally facing the probe 28. To more accurately circumferentially locate the workpiece 24 on the pallet 22, a generally triangular blade 134 (FIG. 1) at one [®nd] *end* of the probe 28 is extended until both sides of the blade 134 engage with both walls of the locator opening 132 of the workpiece 24. A series of dogs 136 at the opposite end of the probe 28 trip a series of limit switches 138 attached to the base 130 of the station 12 to indicate the position of the blade 134; for example, whether a workpiece is present and whether the workpiece has been properly located on the pallet. When it has been determined that the workpiece 24 is properly located, the workpiece 24 is clamped to the pallet 22 and the pallet 22 transferred to the table 20.

Figure 2:
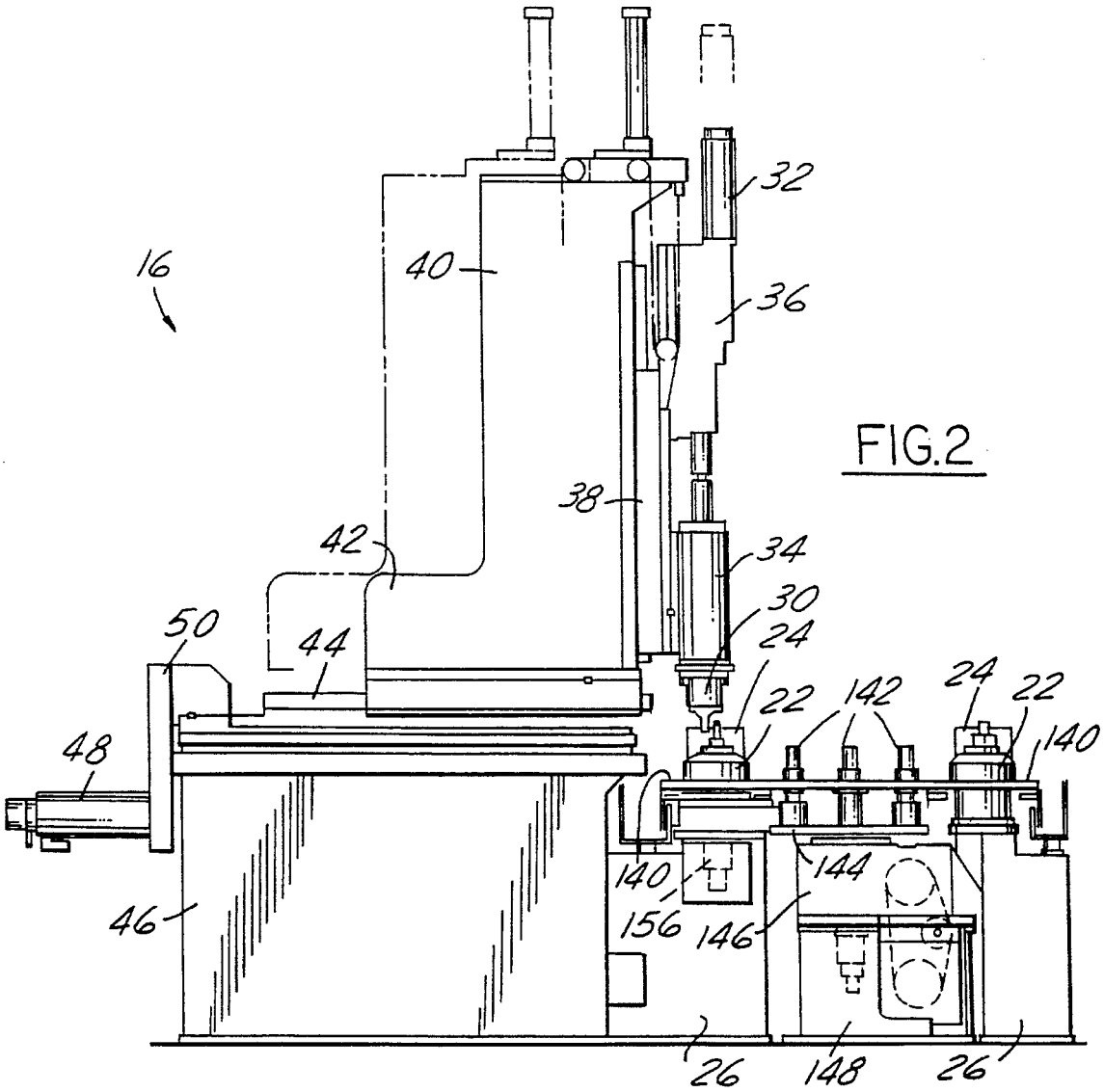
FIG. 2 is a partial side view of the dial machine showing one of the machine tools, and a part loading and unloading station.
Figure 4:
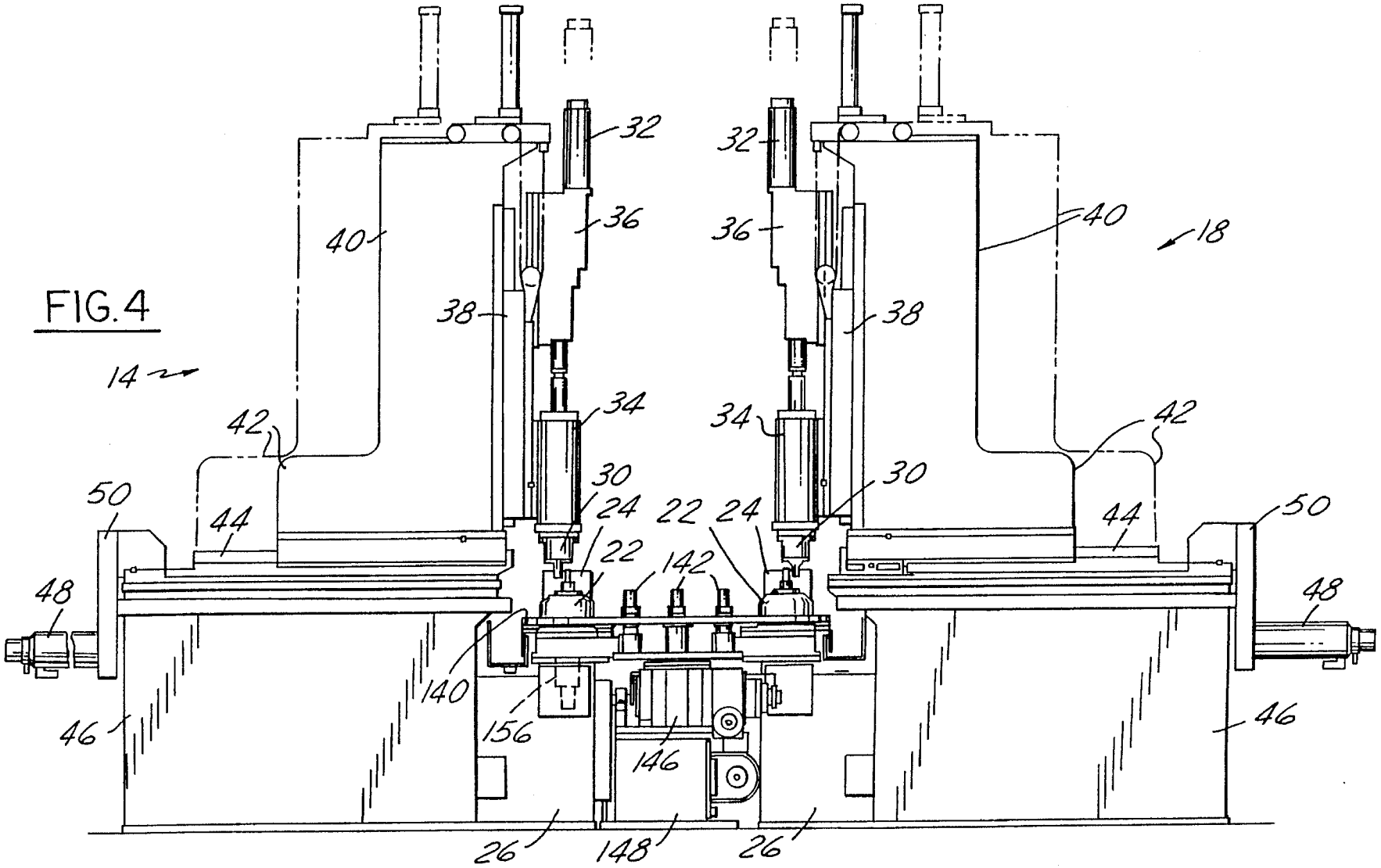
FIG. 4 is a side sectional view taken along line 4—4 of FIG. 1, illustrating two machine tools adjacent the transfer table and two pallets each carrying a workpiece and disposed in one of the machine tools.

As shown in FIGS. 1, 2 and 4, the transfer table 20 has a generally circular table top 140 secured by supports 142 to a platform 144 rotated by a drive 146, such as a two speed A.C. motor, carried by a base 148 for receiving and transferring each workpiece-carrying pallet 22 to each station around the table 20. To receive and preserve the general radial location of each pallet 22 during transfer, the table 20 has four generally cylindrical flanges 98 bounding four circumferentially spaced openings 150 (FIG. 1) in the table top 140 adjacent the outer periphery of the table 20. General circumferential location of the pallet 22 during transfer is maintained by the pair of locator pins 102 in each flange 98 engaging with the openings 104 in the underside of each pallet 22.

A hydraulic lift (see FIGS. 2 and 4) lifts the table 20 from the position shown in FIG. 3 to the height illustrated in phantom to telescopically nest each flange 98 within the skirt 96 of each pallet 22 to transfer the pallet 22 from the fixture 26 to the table 20. When lifted, the motor 146 rotates the table 20 until a position sensing feed-back mechanism (not shown), such as a limit switch, indicates that each pallet 22 is generally positioned over the next station. The four-station dial machine 10 shown in FIG. 1 would require the table 20 to rotate approximately 90° when transferring each pallet 22 to the next station. If, for example, the table 20 was required to transfer pallets 22 to eight stations, an approximately 45° rotation of the table 20 would be necessary. Upon arrival at the next station, the table 20 is lowered to transfer the pallet 22 from the table 20 to the fixture 26 of the station.

A fixture 26 is attached to the base 46, of each machine tool station and has a locator ring 152, (See FIGS. 5 and 6) such as a curvic coupling, thereon with a set of teeth 154 in one face of the ring 152 for complementary mating engagement with the teeth 58 of the locator ring 54 of each pallet 22 to accurately radially, axially and circumferentially locate each pallet 22 and hence its associated workpiece 24 with respect to the spindle 30 of each machine tool station. Similarly, a locator ring 152 on the fixture 26 of the load and unload station 12 accurately locates each pallet 22 with respect to the locator probe 28 of the station 12.

The teeth 154 of each fixture locator ring 152 and the teeth 58 of each pallet ring 54 both have beveled sides and are accurately machined to accurately and complementarily mate even when an engaging ring is initially somewhat out of location with respect to its complement ring. For example, should a pallet 22 be transferred somewhat out of location into a fixture 26, the teeth 58 of the pallet locator ring 54 will cam along the beveled sides of the teeth 154 of the fixture ring 152 to move and guide the pallet 22 into accurate location on the fixture 26.

When a pallet 22 is received upon a fixture 26, the fixture pallet clamp 64 extends from the fixture 26 to grasp the collar 68 of the pallet 22 and draw its locator ring 54 down into positive mating engagement with the ring 152 of the fixture 26 to more accurately locate and secure the pallet 22 on the fixture 26 during machining or loading. As a result of each pair of locator rings 54, 152, accommodating some initial mislocation, the machine tool stations and/or a load and unload station 12 may be replaced or added to the dial machine 10 by only generally locating the new station with respect to the transfer table 20.

If more than one machining operation is to be performed on a workpiece 24 at a machining station, the engaged pair of locator rings 54, 152, pallet 22 and workpiece 24 may be indexed as a unit by a servomotor drive 156 coupled to the locator ring 152 in the machining station fixture 26. For example, the workpiece 24 may be indexed 90° or 60° to perform four or six machining operations in that station.

In operation, the transfer table 20 is lowered to deposit each pallet 22 onto one of the fixtures 26. As the pallet 22 is received into the fixture 26 of the load and unload station 12, it is clamped to the fixture 26 to accurately radially, axially and circumferentially locate the pallet 22. Upon clamping the pallet 22 to the fixture 26, the workpiece release pin 78 of the fixture 26 is extended upwardly releasing the workpiece clamp 82 on the pallet 22. A workpiece 24 to be machined is loaded onto the pallet 22 with its locator opening 132 generally facing the blade 124 of the locator probe 28 of the load station 12. Upon loading, the vertex of the blade 134 is extended forwardly until the workpiece 24 is accurately circumferentially located with respect to the locator ring 54 on the pallet 22 and the locator ring 152 on the load fixture 26. While the blade 134 is still engaging the workpiece 24, the workpiece release pin 78 is retracted into the fixture 26 clamping the workpiece 24 to the pallet 22 in an accurate location on the pallet 22.

To transfer the workpiece 24 to the first machining station 14, the transfer table 20 is raised transferring the pallet 22 and clamped workpiece 24 to the table 20. After the table 20 rotates the pallet 22 over the station 14, the table 20 is lowered and the pallet 22 is deposited on the fixture 26 in this station. Upon releasably clamping the pallet 22 to the fixture 26 to secure and accurately locate the workpiece 24 with respect to the machine tool spindle 30, at least one machining operation is performed.

After machining is completed at the first station 14, the pallet 22 is unclamped, the table 20 is raised lifting the pallet 22, and the table 20 is rotated to deliver the pallet 22 to the second machining station 16. Upon clamping the pallet 22 to the fixture 26 of the station 16, the pallet 22 is secured and the workpiece 24 located for machining. When machining of the workpiece 24 is completed at the station 16, the table 20 transfers the workpiece 24 and pallet 22 to the third machining station 18.

When all machining operations have been performed on the workpiece 24, the table 20 returns the pallet 22 and machined workpiece 24 to the load and unload station 12 where the pallet 22 is releasably clamped to the fixture 26. The finished workpiece 24 is unclamped and removed and thereafter another workpiece 24 to b machined is loaded onto the pallet 22. Typically, a finished workpiece is unloaded and another workpiece loaded after each indexing of the table and different workpieces are machined at substantially the same time in all three machining stations 14, 16 and 18.

While the present invention has been disclosed in connection with the preferred embodiment thereof, it should be understood that there will be other embodiments which fall within the spirit and scope of the invention and that the invention is susceptible to modification, variation and change without departing from the scope and fair meaning of the following claims.

What is claimed is:

1. A multiple station boring machine for locating and transferring a pallet carrying a workpiece having at least one locator thereon for performing a series of machining operations on the workpiece, said machine comprising:

a base;

a table carried by said base for receiving and transporting a pallet thereon;

a drive operably associated with said table for indexing said table relative to the base;

at least one pallet for receiving and clamping a workpiece, a locator ring on said pallet having a plurality of circumferentially spaced and generally radially extending teeth for accurately axially, radially, and circumferentially locating said pallet;

a part loading station adjacent said table having a base, a locator ring on said base having a plurality of circumferentially spaced and generally radially extending teeth for complementary mating engagement with said locator teeth of said locator ring on said pallet for accurately axially, radially and circumferentially locating said pallet on said base and a workpiece locator carried by said base of said part loading station for engaging with the locator of a workpiece for circumferentially locating the workpiece with respect to said locator ring on said pallet and said locator ring on said base in mating engagement therewith; and at least two machine tool stations adjacent said table, each machine tool station having a separate base, a locator ring carried by said base of said machine tool station and having a plurality of circumferentially spaced and generally radially extending teeth for complementary mating engagement with said locator teeth of said locator ring on said pallet for accurately axially, radially, and circumferentially locating the workpiece on said pallet with respect to said base of said machine tool, and a clamp carried by said base of said machine tool station for clamping said pallet to said base while said locator ring on said pallet is in mating engagement with said locator ring on said base of said machine tool station for maintaining the accurate location of the workpiece with respect to said base of said machine tool station during the machining of the workpiece by a machine tool in said machine tool station, whereby said drive moves said table to transfer a pallet seriatim from one station to another station.

2. The multiple station boring machine of claim i wherein said drive operably associated with said table rotates and vertically reciprocates said table for raising said table to lift said pallet from said base of said station, rotating said table to advance said pallet to another succeeding station and lowering said table to deposit said locator ring of said pallet into mating engagement with said locator ring on said base of said another station.

3. The multiple station boring machine of claim 1 wherein said table is generally circular and has a plurality of circumferentially spaced openings in said table for receiving at least one pallet and an upwardly projecting generally cylindrical flange on said table bounding each of said openings for generally radially locating said pallet received on said table with respect to said table.

4. The multiple station boring machine of claim 3 wherein said pallet also comprises a skirt about the lower periphery of said pallet for releasably nesting with said flange on said table for radially locating and constraining said pallet when carried by said table.

5. The multiple station boring machine of claim 3 wherein said flange of said table has at least one locator thereon and said pallet has at least one complementary locator thereon for matingly engaging said at least one locator on said flange on said table with said at least one locator of said pallet for generally circumferentially, radially, and axially locating the workpiece on said pallet with respect to said table for maintaining the location of the workpiece during the indexing of said table.

6. The multiple station boring machine of claim 5 wherein said locator on said flange comprises a first generally round spring-biased locator dowel and a circumferentially spaced second generally diamond-shaped spring-biased relief locator dowel extending therefrom and said locator of said pallet comprises corresponding openings complementary with said dowels for complementary mating engagement with said locator dowels when said pallet is received by said table for generally circumferentially, radially, and axially locating said pallet with respect to said table and for maintaining the location of said pallet during the indexing of said table.

7. The multiple station boring machine of claim 1 wherein said locator ring is integral with said pallet.

8. The multiple station boring machine of claim 1 wherein said pallet also comprises a diametrically adjustable collet for receiving, supporting and releasably clamping a workpiece to said pallet.

9. The multiple station boring machine of claim 1 wherein said pallet also comprises a radially adjustable clamp for receiving, supporting and releasably clamping an outer surface of the workpiece for releasably securing the workpiece to said pallet.

10. The pallet of claim 1 wherein said pallet also comprises a catch extending from the bottom of said pallet for receiving said clamp of said machine tool station.

11. The pallet of claim 10 wherein said catch comprises a generally cylindrical collar having an inverted generally frustoconical end for receiving said clamp of said machine tool station.

12. The multiple station boring machine of claim 1 wherein said pallet also comprises a diametrically adjustable collet on said pallet for receiving the workpiece thereon, for radially and axially locating the workpiece with respect to said pallet and said locator ring on said pallet, and for releasably affixing the workpiece to said pallet, a catch on the bottom of said pallet for receiving said clamp of said machine tool station, said locator ring attached to the bottom of said pallet, a skirt adjacent the periphery of the bottom of said pallet for nesting with said flange of said table for generally radially and axially locating and constraining said pallet on said table, and a locator on the bottom of said pallet for complementary mating engagement with said locator of said table for generally locating said pallet with respect to said table.

13. The multiple station boring machine of claim 1 wherein said base of said machine tool station also comprises an indexable platform, a drive operably associated with said platform for rotatively incrementally indexing said pallet and the workpiece on said pallet while said locator ring on said pallet is matingly engaged with said locator ring on said indexable platform of said base for performing more than one machining operation on the workpiece while at that machine tool station.

14. The multiple station boring machine of claim 13 wherein said drive operably associated with said indexable platform of said base of said machine tool station comprises a servomotor for indexing said pallet and the workpiece on said pallet while said locator ring on said pallet is matingly engaged with said locator ring carried by said indexable platform of said base for performing more than one machining operation on the workpiece while at that machine tool station.

15. The multiple station boring machine of claim 13 wherein said drive operably associated with said indexable platform of said base comprises a circumferentially incrementally indexing servomotor for indexing said pallet and the workpiece on said pallet while said locator ring on said pallet is matingly engaged with said locator ring on said indexable platform on said base for performing more than one machining operation to the workpiece while at that machine tool station.

16. The multiple station boring machine of claim 1 wherein said part loading station also comprises a clamp carried by said base of said part loading station for clamping said pallet to said base during loading of the workpiece onto said pallet.

17. The multiple station boring machine of claim 1 wherein said workpiece locator of said part loading station also comprises an elongate reciprocable arm carried by said base of said part loading station and a generally triangular locator blade at one end of said arm for extending said blade of said arm engaging the locator of the workpiece for accurately circumferentially locating the workpiece with respect to said locator ring on said pallet and said locator ring on said base of said part loading station in mating engagement therewith.

18. A method of transferring and locating a pallet carrying a workpiece having at least one locator thereon for performing a series of machining operations to the workpiece comprising: providing a table with a base and a drive operably connected with the table for indexing the table relative to the base, at least one pallet for receiving and releasably affixing a workpiece to the pallet and a locator ring having a plurality of circumferentially spaced and generally radially extending teeth for accurately axially, radially and circumferentially locating the pallet, a part loading station adjacent the table having a base and a locator ring thereon having a plurality of circumferentially spaced and generally radially extending teeth for complementary mating engagement with the teeth of the locator ring on the pallet for accurately locating the pallet on the base of the loading station, and at least two machine tool stations adjacent the table, each machine tool station having a separate base and a locator ring thereon for complementary mating engagement with the teeth of the locator ring on the pallet for accurately axially, radially and circumferentially locating the pallet with respect to the machine tool station base, and a clamp for releasably clamping the pallet to the base of the machine tool station while the locator ring of the pallet is in mating engagement with the locator ring of the base of the machine tool station and a machine tool for performing machining operations on the workpiece, loading the workpiece on the pallet at the part loading station to accurately radially, axially, and circumferentially orient the part with respect to the pallet including engaging the locator of the workpiece to accurately circumferentially orient and locate the workpiece with respect to the pallet clamping the workpiece to the pallet, indexing the pallet to a first machine tool station, locating the pallet on the base of the machine tool station by matingly engaging the teeth o the locator ring on the pallet with the teeth of the locator ring on the base of the machine tool station, clamping the pallet to the base while the locator ring on the pallet is in mating engagement with the locator ring on the base of the machine tool station, performing at least one machining operation on the workpiece on the pallet, releasing the pallet, and indexing the pallet to a second machine tool station, locating the pallet on the base of the second machine tool station by matingly engaging the teeth of the locator ring on the pallet with the teeth of the locator ring on the base of the second machine tool station, clamping the pallet to the base while the locator ring on the pallet is in mating engagement with the locator ring on the base of the second machine tool station, performing at least one machining operation on the workpiece on the pallet, releasing the pallet, and after all machining operations have been performed, indexing the pallet and workpiece to the load station removing the workpiece from the pallet and thereafter loading another workpiece onto the pallet.

19. The method of claim 18 which also comprises: providing a workpiece locator carried by the base of the part loading station, engaging the workpiece locator of the part loading station with the locator of a workpiece loaded onto a pallet at the part loading station circumferentially locating the workpiece with respect to the locator ring on the pallet and the locator ring on the base of the part loading station, and disengaging the workpiece locator from the workpiece.

20. The method of claim 18 which also comprises: providing a generally circular table with a plurality of circumferentially spaced openings in said table for receiving at least one pallet, an upwardly projecting generally cylindrical flange bounding each opening for generally radially and axially locating a pallet received by an opening in the table, and a skirt about the lower periphery of the pallet for releasably nesting with the flange on the table for radially locating and constraining the pallet when carried by an opening in the table, raising the table to pick up a pallet at a station by nesting the flange on the table within the skirt of the pallet to generally radially and axially locate the pallet on the table for indexing, indexing the table to another station, and lowering the table to deposit the pallet onto the base of the station with the locator ring on the pallet in mating engagement with the locator ring on the base of the station.

21. The method of claim 20 which also comprises: providing at least one locator dowel extending from each flange, at least one complementary locator opening in the pallet for receiving a locator dowel of the table, raising the table to pick up a pallet at a station by nesting the flange on the table within the skirt of the pallet with each locator dowel extending from the flange on the table complementarily engaging with each locator opening in the pallet generally radially, axially, and circumferentially locating the pallet on the table, indexing the table to another station, and lowering the table disengaging each locator dowel in the flange from each locator opening of the pallet depositing the pallet onto the base of the station with the locator ring on the pallet in mating engagement with the locator ring on the base of the station.

22. The method of claim 18 which also comprises: for at least one machine tool station providing an indexable platform carrying its locator ring, and a drive operably associated with the platform for rotatively incrementally indexing the pallet and the workpiece on the pallet, receiving the pallet in such machine tool station with the locator ring on the pallet in mating engagement with the locator ring on the platform, clamping the pallet to the platform by the clamp carried by the base of the machine tool station, performing at least one machining operation on the workpiece on the pallet by a machine tool in the machine tool station, indexing the platform, pallet and workpiece in unison, performing at least one machining operation on the indexed workpiece by a machine tool in such machine tool station, releasing the clamp from the pallet and transferring the pallet and workpiece out of such machine tool station.

23. The method of claim 18 which also comprises: indexing the table carrying the pallet to the part loading station, lowering the table to transfer the pallet from the table onto the base of the part loading station with the locator teeth of the locator ring on the pallet in mating engagement with the locator teeth of the locator ring on the base of the part loading station to accurately locate the pallet with respect to the base of the part loading station, loading a workpiece onto the pallet, accurately axially and radially locating the workpiece on the pallet with respect to the locator ring on the pallet and the locator ring on the base of the part loading station in mating engagement therewith, engaging said workpiece locator of the part loading station with the locator on the workpiece for accurately circumferentially locating the workpiece on the pallet with respect to the locator ring on the pallet and the locator ring on the base of the part loading station in mating engagement therewith, releasably clamping the workpiece to the pallet for maintaining the accurate location of the workpiece on the pallet during indexing of the pallet and machining of the workpiece, and raising the table to lift the pallet from the base of the part loading station onto the table for indexing the pallet to the next station.

24. The method of claim 23 which also comprises: providing a workpiece locator of the part loading station having an elongate reciprocable arm carried by the base of the part loading station and a generally triangular locator blade at one end of the arm, extending the blade of the arm to engage the locator of the workpiece for accurately circumferentially locating the workpiece with respect to the locator ring on the pallet and the locator ring on the base of the part loading station in mating engagement therewith, clamping the workpiece to the pallet, and retracting the blade of the arm from the workpiece.

25. The method of claim 23 which also comprises: providing a catch on the underside of the pallet for engagement by a clamp, and a clamp operably associated with the base of the part loading station for clamping the pallet, clamping the pallet to the base of the part loading station with the locator ring of the pallet in mating engagement with the locator ring on the base of the part loading station, loading the workpiece onto the pallet, accurately locating the workpiece on the pallet with respect to the locator ring on the pallet and the locator ring on the base of the part loading station in mating engagement therewith, clamping the workpiece to the pallet, releasing the pallet from the clamp operably associated with the base of the part loading station and transferring the pallet from the base of the part loading station onto the table for indexing the pallet and workpiece to the next station.

*26. A multiple station boring machine for locating and transferring a pallet carrying a workpiece for performing a series of machining operations on the workpiece, said machine comprising:*

*a base;*

*a table carried by said base for receiving and transporting a pallet thereon;*

*a drive operably associated with said table for indexing said table relative to the base;*

*at least one pallet for receiving and clamping a workpiece, a locator ring on said pallet having a plurality of circumferentially spaced and generally radially extending teeth for accurately axially, radially, and circumferentially locating said pallet;*

*a part loading station adjacent said table having a base, a locator ring on said base having a plurality of circumferentially spaced and generally radially extending teeth for complementary mating engagement with*

*said locator teeth of said locator ring on said pallet for accurately axially, radially and circumferentially locating said pallet on said base; and*

*at least two machine tool stations adjacent said table, each machine tool station having a separate base, the separate base of each machine tool station being independent of the bases of all other machine tool stations, a locator ring carried by said separate base of said machine tool station and having a plurality of circumferentially spaced and generally radially extending teeth for complementary mating engagement with said locator teeth of said locator ring on said pallet for accurately axially, radially, and circumferentially locating the workpiece on said pallet with respect to said separate base of said machine tool station and a separate clamp carried by said separate base of said machine tool station for clamping said pallet to said separate base while said locator ring on said pallet is in mating engagement with said locator ring on said separate base of said machine tool station for maintaining the accurate location of the workpiece with respect to said separate base of said machine tool station during the machining of the workpiece by a machine tool in said machine tool station independently of all other pallets, whereby said drive moves said table to transfer a pallet seriatim from one station to another station.*

*27. The multiple station boring machine of claim 26 wherein said drive operably associated with said table rotates and vertically reciprocates said table for raising said table to lift said pallet from said base of said station, rotating said table to advance said pallet to another succeeding station and lowering said table to deposit said locator ring of said pallet into mating engagement with said locator ring on said base of said another station.*

*28. A multiple station boring machine for locating and transferring a pallet carrying a workpiece for performing a series of machining operations on the workpiece, said machine comprising:*

*a base;*

*a table carried by said base for receiving and transporting a pallet thereon;*

*a drive operably associated with said table for indexing said table relative to the base;*

*at least one pallet for receiving and clamping a workpiece, a locator ring on said pallet having a plurality of circumferentially spaced and generally radially extending teeth for accurately axially, radially, and circumferentially locating said pallet;*

*a part loading station adjacent said table having a base, a locator ring on said base having a plurality of circumferentially spaced and generally radially extending teeth for complementary mating engagement with said locator teeth of said locator ring on said pallet for accurately axially, radially and circumferentially locating said pallet on said base;*

*at least two machine tool stations adjacent said table, each machine tool station having a separate base, a locator ring carried by said base of each said machine tool station and having a plurality of circumferentially spaced and generally radially extending teeth for complementary mating engagement with said locator teeth of said locator ring on said pallet for accurately axially, radially, and circumferentially locating the workpiece on said pallet with respect to said base of said machine tool, and a clamp carried by said base of each said machine tool station for clamping said pallet to said base while said locator ring on said pallet is in mating engagement with said locator ring on said base of said machine tool station for maintaining the accurate location of the workpiece with respect to said base of said machine tool station during the machining of the workpiece by a machine tool in said machine tool station independently of all other pallets, whereby said drive moves said table to transfer a pallet seriatim from one station to another station, and said table is generally circular and has a plurality of circumferentially spaced opening in said table for receiving at least one pallet and an upwardly projecting generally cylindrical flange on said table bounding each of said openings for generally radially locating said pallet received on said table with respect to said table.*

*29. The multiple station boring machine of claim 28 wherein said pallet also comprises a skirt about the lower periphery of said pallet for releasably nesting with said flange on said table for radially locating and constraining said pallet when carried by said table.*

*30. The multiple station boring machine of claim 28 wherein said flange of said table has at least one locator thereon and said pallet has at least one complementary locator thereon for matingly engaging said at least one locator on said flange on said table with said at least one locator of said pallet for generally circumferentially, radially, and axially locating the workpiece on said pallet with respect to said table for maintaining the location of the workpiece during the indexing of said table.*

*31. The multiple station boring machine of claim 30 wherein said locator on said flange comprises a first generally round spring-biased locator dowel and a circumferentially spaced second generally diamond-shaped spring-biased relief locator dowel extending therefrom and said locator of said pallet comprises corresponding openings complementary with said dowels for complementary mating engagement with said locator dowels when said pallet is received by said table for generally circumferentially, radially, and axially locating said pallet with respect to said table and for maintaining the locating of said pallet during the indexing of said table.*

*32. The multiple station boring machine of claim 26 wherein said locator ring is integral with said pallet.*

*33. The multiple station boring machine of claim 26 wherein said pallet also comprises a diametrically adjustable collet for receiving, supporting and releasably clamping a workpiece to said pallet.*

*34. The multiple station boring machine of claim 26 wherein said pallet also comprises a radially adjustable clamp for receiving, supporting and releasably clamping an outer surface of the workpiece for releasably securing the workpiece to said pallet.*

*35. A multiple station boring machine for locating and transferring a pallet carrying a workpiece for performing a seies of machining operations on the workpiece, said machine comprising:*

*a base;*

*a table carried by said base for receiving and transporting a pallet thereon;*

*a drive operably associated with said table for indexing said table relative to the base;*

*at least one pallet for receiving and clamping a workpiece, a locator ring on said pallet having a plurality of circumferentially spaced and generally radially extending teeth for accurately axially, radially, and circumferentially locating said pallet;*

*a part loading station adjacent said table having a base, a locator ring on said base having a plurality of circumferentially spaced and generally radially extending teeth for complementary mating engagement with said locator teeth of said locator ring on said pallet for accurately axially, radially and circumferentially locating said pallet on said base;*

*at least two machine tool stations adjacent said table, each machine tool station having a separate base, a locator ring carried by said base of each said machine tool station and having a plurality of circumferentially spaced and generally radially extending teeth for complementary mating engagement with said locator teeth of said locator ring on said pallet for accurately axially, radially, and circumferentially locating the workpiece on said pallet with respect to said base of said machine tool, and a clamp carried by said base of each said machine tool station for clamping said pallet to said base while said locator ring on said pallet is in mating engagement with said locator ring on said base of said machine tool station for maintaining the accurate location of the workpiece with respect to said base of said machine tool station during the machining of the workpiece by a machine tool in said machine tool station independently of all other pallets, whereby said drive moves said table to transfer a pallet seriatim from one station to another station, and said pallet also comprises a catch extending from the bottom of said pallet for receiving said clamp of said machine tool station.*

*36. The pallet of claim 35 wherein said catch comprises a generally cylindrical collar having an inverted generally frustoconical end for receiving said clamp of said machine tool station.*

*37. A multiple station boring machine for locating and transferring a pallet carrying a workpiece for performing a series of machining operations on the workpiece, said machine comprising:*

*a base;*

*a table carried by said base for receiving and transporting a pallet thereon;*

*a drive operably associated with said table for indexing said table relative to the base;*

*at least one pallet for receiving and clamping a workpiece, a locator ring on said pallet having a plurality of circumferentially spaced and generally radially extending teeth for accurately axially, radially, and circumferentially locating said pallet;*

*a part loading station adjacent said table having a base, a locator ring on said base having a plurality of circumferentially spaced and generally radially extending teeth for complementary mating engagement with said locator teeth of said locator ring on said pallet for accurately axially, radially and circumferentially locating said pallet on said base;*

*at least two machine tool stations adjacent said table, each machine tool station having a separate base, a locator ring carried by said base of each said machine tool station and having a plurality of circumferentially spaced and generally radially extending teeth for complementary mating engagement with said locator teeth of said locator ring on said pallet for accurately axially, radially, and circumferentially locating the workpiece on said pallet with respect to said base of said machine tool, and a clamp carried by said base of each said machine tool station for clamping said pallet to said base while said locator ring on said pallet is in mating engagement with said locator ring on said base of said machine tool station for maintaining the accurate location of the workpiece with respect to said base of said machine tool station during the machining of the workpiece by a machine tool in said machine tool station independently of all other pallets, whereby said drive moves said table to transfer a pallet seriatim from one station to another station, and said pallet also comprises a diametrically adjustable collet on said pallet for receiving the workpiece thereon, for radially and axially locating the workpiece with respect to said pallet and said locator ring on said pallet, and for releasably affixing the workpiece to said pallet, a catch on the bottom of said pallet for receiving said clamp of said machine tool station, said locator ring attached to the bottom of said pallet, a skirt adjacent the periphery of the bottom of said pallet for nesting with said flange of said table for generally radially and axially locating and constraining said pallet on said table, and a locator on the bottom of said pallet for complementary mating engagement with said locator of said table for generally locating said pallet with respect to said table.*

*38. The multiple station boring machine of claim 26 wherein said base of said machine tool station also comprises an indexable platform, a drive operably associated with said platform for rotatively incrementally indexing said pallet and the workpiece on said pallet while said locator ring on said pallet is matingly engaged with said locator ring on said indexable platform of said base for performing more than one machining operation on the workpiece while at that machine tool station.*

*39. The multiple station boring machine of claim 38 wherein said drive operably associated with said indexable platform of said base of said machine tool station comprises a servomotor for indexing said pallet and the workpiece on said pallet while said locator ring on said pallet is matingly engaged with said locator ring carried by said indexable platform of said base for performing more than one machining operation on the workpiece while at that machine tool station.*

*40. The multiple station boring machine of claim 38 wherein said drive operably associated with said indexable platform of said base comprises a circumferentially incrementally indexing servomotor for indexing said pallet and the workpiece on said pallet while said locator ring on said pallet is matingly engaged with said locator ring on said indexable platform on said base for performing more than one machining operation to the workpiece while at that machine tool station.*

*41. A multiple station boring machine for locating and transferring a pallet carrying a workpiece for performing a series of machining operations on the workpiece, said machine comprising:*

*a base;*

*a table carried by said base for receiving and transporting a pallet thereon;*

*a drive operably associated with said table for indexing said table relative to the base;*

*at least one pallet for receiving and clamping a workpiece, a locator ring on said pallet having a plurality of circumferentially spaced and generally radially extending teeth for accurately axially, radially, and circumferentially locating said pallet;*

*a part loading station adjacent said table having a base, a locator ring on said base having a plurality of*

*circumferentially spaced and generally radially extending teeth for complementary mating engagement with said locator teeth of said locator ring on said pallet for accurately axially, radially and circumferentially locating said pallet on said base;*

*at least two machine tool stations adjacent said table, each machine tool station having a separate base, a locator ring carried by said base of each said machine tool station and having a plurality of circumferentially spaced and generally radially extending teeth for complementary mating engagement with said locator teeth of said locator ring on said pallet for accurately axially, radially, and circumferentially locating the workpiece on said pallet with respect to said base of said machine tool, and a clamp carried by said base of each said machine tool station for clamping said pallet to said base while said locator ring on said pallet is in mating engagement with said locator ring on said base of said machine tool station for maintaining the accurate location of the workpiece with respect to said base of said machine tool station during the machining of the workpiece by a machine tool in said machine tool station independently of all other pallets, whereby said drive moves said table to transfer a pallet seriatim from one station to another station, and said part loading station also comprises a clamp carried by said base of said part loading station for clamping said pallet to said base during loading of the workpiece onto said pallet.*

*42. A method of transferring and locating a pallet carrying a workpiece for performing a series of machining operations to the workpiece comprising: providing a table with a base and a drive operably connected with the table for indexing the table relative to the base, at least one pallet for receiving and releasably affixing a workpiece to the pallet and a locator ring having a plurality of circumferentially spaced and generally radially extending teeth for accurately axially, radially and circumferentially locating the pallet, a part loading station adjacent the table having a base and a locator ring thereon having a plurality of circumferentially spaced and generally radially extending teeth for complementary mating engagement with the teeth of the locator ring on the pallet for accurately locating the pallet on the base of the loading station, and at least two machine tool stations adjacent the table, each machine tool station having a separate base and a locator ring thereon for complementary mating engagement with the teeth of the locator ring on the pallet for accurately axially, radially and circumferentially locating the pallet with respect to the machine tool station separate base, the separate base of each machine tool station being independent of the bases of all other machine tool stations, and a separate clamp for releasably clamping the pallet to the separate base of the machine tool station while the locator ring of the pallet is in mating engagement with the locator ring of the separate base of the machine tool station, and a machine tool for performing machining operations on the workpiece, loading the workpiece on the pallet at the part loading station, clamping the workpiece to the pallet, indexing the pallet to a first machine tool station, locating the pallet on the base of the machine tool station by matingly engaging the teeth of the locator ring on the pallet with the teeth of the locator ring on the separate base of the machine tool station, clamping the pallet to the separate base while the locator ring on the pallet is in mating engagement with the locator ring on the separate base of the machine tool station independently of all other pallets, performing at least one machining operation on the workpiece on the pallet, releasing the pallet, and indexing the pallet to a second machine tool station, locating the pallet on the separate base of the second machine tool station by matingly engaging the teeth of the locator ring on the pallet with the teeth of the locator ring on the separate base of the second machine tool station, clamping the pallet to the separate base while the locator ring on the pallet is in mating engagement with the locator ring on the separate base of the second machine tool station independently of all other pallets, performing at least one machining operation on the workpiece on the pallet, releasing the pallet, and after all machining operations having been performed, indexing the pallet and workpiece to the load station, removing the workpiece from the pallet and thereafter loading another workpiece onto the pallet.*

*43. A method of transferring and locating a pallet carrying a workpiece for performing a series of machining operations to the workpiece comprising: providing a table with a base and a drive operably connected with the table for indexing the table relative to the base, at least one pallet for receiving and releasably affixing a workpiece to the pallet and a locator ring having a plurality of circumferentially spaced and generally radially extending teeth for accurately axially, radially and circumferentially locating the pallet, a part loading station adjacent the table having a base and a locator ring thereon having a plurality of circumferentially spaced and generally radially extending teeth for complementary mating engagement with the teeth of the locator ring on the pallet for accurately locating the pallet on the base of the loading station, and at least two machine tool stations adjacent the table, each machine tool station having a separate base and a locator ring thereon for complementary mating engagement with the teeth of the locator ring on the pallet for accurately axially, radially and circumferentially locating the pallet with respect to the machine tool station base, and a clamp for releasably clamping the pallet to the base of each machine tool station while the locator ring of the pallet is in mating engagement with the locator ring of the base of the machine tool station, and a machine tool for performing machining operations on the workpiece, loading the workpiece on the pallet at the part loading station, clamping the workpiece to the pallet, indexing the pallet to a first machine tool station, locating the pallet on the base of the machine tool station by matingly engaging the teeth of the locator ring on the pallet with the teeth of the locator ring on the base of the machine tool station, clamping the pallet to the base while the locator ring on the pallet is in mating engagement with the locator ring on the base of the machine tool station independently of all other pallets, performing at least one machining operation on the workpiece on the pallet, releasing the pallet, and indexing the pallet to a second machine tool station, locating the pallet on the separate base of the second machine tool station by matingly engaging the teeth of the locator ring on the pallet with the teeth of the locator ring on the base of the second machine tool station, clamping the pallet to the base while the locator ring on the pallet is in mating engagement with the locator ring on the base of the second machine tool station independently of all other pallets, performing at least one machining operation on the workpiece on the pallet, releasing the pallet, and after all machining operations having been performed, indexing the pallet and workpiece to the load station, removing the workpiece from the pallet and thereafter loading another workpiece onto the pallet. and providing a workpiece locator carried by the base of the part loading station, engaging the workpiece locator of the part loading station with a loader of a workpiece loaded onto a*

*pallet at the part loading station, circumferentially locating the workpiece with respect to the locator ring on the pallet and the locator ring on the base of the part loading station, and disengaging the workpiece locator from the workpiece.*

*44. A method of transferring and locating a pallet carrying a workpiece for performing a series of machining operations to the workpiece comprising: providing a table with a base and a drive operably connected with the table for indexing the table relative to the base, at least one pallet for receiving and releasably affixing a workpiece to the pallet and a locator ring having a plurality of circumferentially spaced and generally radially extending teeth for accurately axially, radially and circumferentially locating the pallet, a part loading station adjacent the table having a base and a locator ring thereon having a plurality of circumferentially spaced and generally radially extending teeth for complementary mating engagement with the teeth of the locator ring on the pallet for accurately locating the pallet on the base of the loading station, and at least two machine tool stations adjacent the table, each machine tool station having a separate base and a locator ring thereon for complementary mating engagement with the teeth of the locator ring on the pallet for accurately axially, radially and circumferentially locating the pallet with respect to the machine tool station base, and a clamp for releasably clamping the pallet to the base of the machine tool station while the locator ring of the pallet is in mating engagement with the locator ring of the base of the machine tool station, and a machine tool for performing machining operations on the workpiece, loading the workpiece on the pallet at the part loading station, clamping the workpiece to the pallet, indexing the pallet to a first machine tool station, locating the pallet on the base of the machine tool station by matingly engaging the teeth of the locator ring on the pallet with the teeth of the locator ring on the base of the machine tool station, clamping the pallet to the base while the locator ring on the pallet is in mating engagement with the locator ring on the base of the machine tool station independently of all other pallets, performing at least one machining operation on the workpiece on the pallet, releasing the pallet, and indexing the pallet to a second machine tool station, locating the pallet on the base of the second machine tool station by matingly engaging the teeth of the locator ring on the pallet with the teeth of the locator ring on the base of the second machine tool station, clamping the pallet to the base while the locator ring on the pallet is in mating engagement with the locator ring on the base of the second machine tool station independently of all other pallets, performing at least one machining operation on the workpiece on the pallet, releasing the pallet, and after all machining operations having been performed, indexing the pallet and workpiece to the load station, removing the workpiece from the pallet and thereafter loading another workpiece onto the pallet, and providing a generally circular table with a plurality of circumferentially spaced openings in said table for receiving at least one pallet, an upward projecting generally cylindrical flange bounding each opening for generally radially and axially locating a pallet received by an opening in the table, and a skirt about the lower periphery of the pallet for releasably nesting with the flange on the table for radially locating and constraining the pallet when carried by an opening in the table, raising the table to pick up a pallet at a station by nesting the flange on the table within the skirt of the pallet to generally radially and axially locate the pallet on the table for indexing, indexing the table to another station, and lowering the table to deposit the pallet onto the base of the station with the locator ring on the pallet in mating engagement with the locator ring on the base of the station.*

*45. The method of claim 44 which also comprises: providing at least one locator dowel extending from each flange, at least one complementary locator opening in the pallet for receiving a locator dowel of the table, raising the table to pick up a pallet at a station by nesting the flange on the table within the skirt of the pallet with each locator dowel extending from the flange on the table complementarily engaging with each locator opening in the pallet generally radially, axially, and circumferentially locating the pallet on the table, indexing the table to another station, and lowering the table disengaging each locator dowel in the flange from each locator opening of the pallet depositing the pallet onto the base of the station with the locator ring on the pallet in mating engagement with the locator ring on the base of the station.*

*46. The method of claim 42 which also comprises: for at least one machine tool station providing an indexable platform carrying its locator ring, and a drive operably associated with the platform for rotatively incrementally indexing the pallet and the workpiece on the pallet, receiving the pallet in such machine tool station with the locator ring on the pallet in mating engagement with the locator ring on the platform, clamping the pallet to the platform by the clamp carried by the base of the machine tool station, performing at least one machining operation on the workpiece on the pallet by a machine tool in the machining tool station, indexing the platform, pallet and workpiece in unison, performing at least one machining operation on the indexed workpiece by a machine tool in such machine tool station, releasing the clamp from the pallet and transferring the pallet and workpiece out of such machine tool station.*

*47. A method of transferring and locating a pallet carrying a workpiece for performing a series of machining operations to the workpiece comprising: providing a table with a base and a drive operably connected with the table for indexing the table relative to the base, at least one pallet for receiving and releasably affixing a workpiece to the pallet and a locator ring having a plurality of circumferentially spaced and generally radially extending teeth for accurately axially, radially and circumferentially locating the pallet, a part loading station adjacent the table having a base and a locator ring thereon having a plurality of circumferentially spaced and generally radially extending teeth for complementary mating engagement with the teeth of the locator ring on the pallet for accurately locating the pallet on the base of the loading station, and at least two machine tool stations adjacent the table, each machine tool station having a separate base and a locator ring thereon for complementary mating engagement with the teeth of the locator ring on the pallet for accurately axially, radially and circumferentially locating the pallet with respect to the machine tool station base, and a clamp for releasably clamping the pallet to the base of each machine tool station while the locator ring of the pallet is in mating engagement with the locator ring of the base of the machine tool station, and a machine tool for performing machining operations on the workpiece, loading the workpiece on the pallet at the part loading station, clamping the workpiece to the pallet, indexing the pallet to a first machine tool station, locating the pallet on the base of the machine tool station by matingly engaging the teeth of the locator ring on the pallet with the teeth of the locator ring on the base of the machine tool station, clamping the pallet to the base while the locator ring on the pallet is in mating engagement with the locator ring on the base of the machine tool station performing at least*

*one machining operation on the workpiece on the pallet, releasing the pallet, and indexing the pallet to a second machine tool station, locating the pallet on the base of the second machine tool station by matingly engaging the teeth of the locator ring on the pallet with the teeth of the locator ring on the base of the second machine tool station, clamping the pallet to the base while the locator ring on the pallet is in mating engagement with the locator ring on the base of the second machine tool station, performing at least one machining operation on the workpiece on the pallet, releasing the pallet, and after all machining operations have been performed, indexing the pallet and workpiece to the load station, removing the workpiece from the pallet and thereafter loading another workpiece onto the pallet, and indexing the table carrying the pallet to the part loading station, lowering the table to transfer the pallet from the table onto the base of the part loading station with the locator teeth of the locator ring on the pallet in mating engagement with the locator teeth of the locator ring on the base of the part loading station to accurately locate the pallet with respect to the base of the part loading station, loading a workpiece onto the pallet, accurately axially and radially locating the workpiece on the pallet with respect to the locator ring on the pallet and the locator ring on the base of the part loading station in mating engagement therewith, releasably clamping the workpiece to the pallet for maintaining the accurate location of the workpiece on the pallet during indexing of the pallet and machining of the workpiece, and raising the table to lift the pallet from the base of the part loading station onto the table for indexing the pallet to the next station.*

*48. The method of claim 42 which also comprises: providing a catch on the underside of the pallet for engagement by a clamp, and a clamp operably associated with the base of the part loading station for clamping the pallet, clamping the pallet to the base of the part loading station with the locator ring of the pallet in mating engagement with the locator ring on the base of the part loading station, loading the workpiece onto the pallet, clamping the workpiece to the pallet, releasing the pallet from the clamp operably associated with the base of the part loading station and transferring the pallet from the base of the part loading station onto the table for indexing the pallet and workpiece to the next station.*

*49. The multiple station boring machine of claim 26 wherein said workpiece locator of said part loading station also comprises an elongate reciprocable arm carried by said base of said part loading station and a generally triangular locator blade at one end of said arm for extending said blade on said arm engaging the locator of the workpiece for accurately circumferentially locating the workpiece with respect to said locator ring on said pallet and said locator ring on said base of said part loading station in mating engagement therewith.*

*50. The method of claim 42 which also comprises: providing a workpiece locator of the part loading station having an elongate reciprocable arm carried by the base of the part loading station and a generally triangular locator blade at one end of the arm, extending the blade of the arm to engage the locator of the workpiece for accurately circumferentially locating the workpiece with respect to the locator ring on the pallet and the locator ring on the base of the part loading station in mating engagement therewith, clamping the workpiece to the pallet, and retracting the blade of the arm from the workpiece.*

* * * * *